March 17, 1959   J. R. HAMILTON   2,877,604
BAFFLE PLATE AND SETTLE-BLOW MECHANISM
Filed Sept. 4, 1956   3 Sheets-Sheet 1

INVENTOR.
Joseph R. Hamilton
BY
Bair, Freeman & Molinare
Attys.

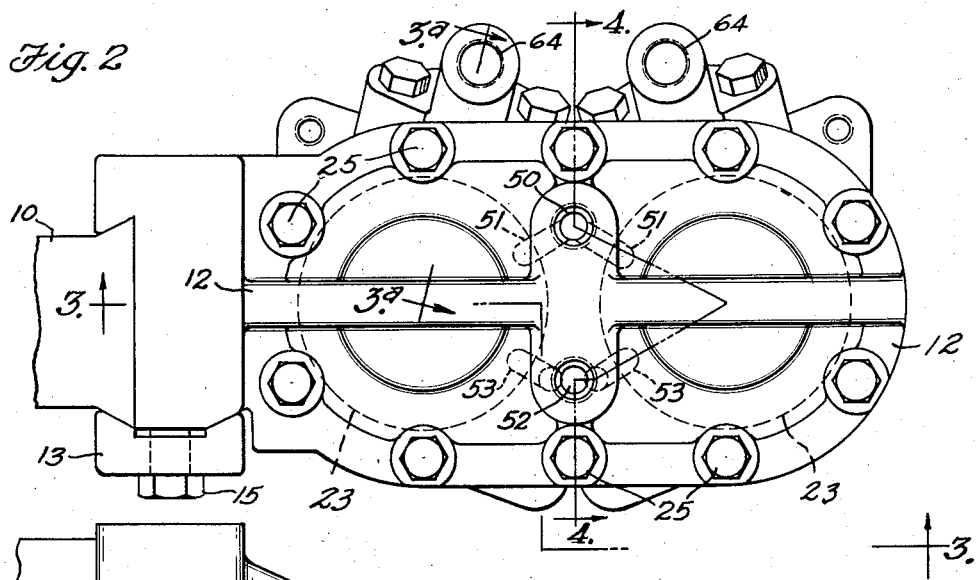
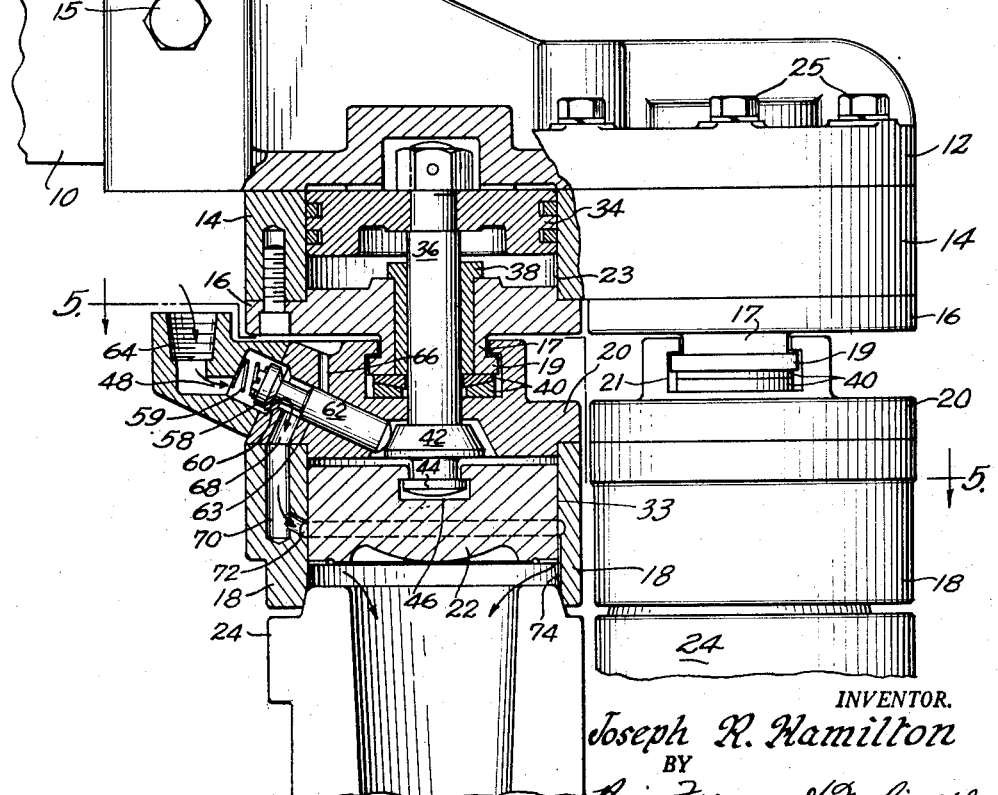

March 17, 1959 J. R. HAMILTON 2,877,604
BAFFLE PLATE AND SETTLE-BLOW MECHANISM
Filed Sept. 4, 1956 3 Sheets-Sheet 3
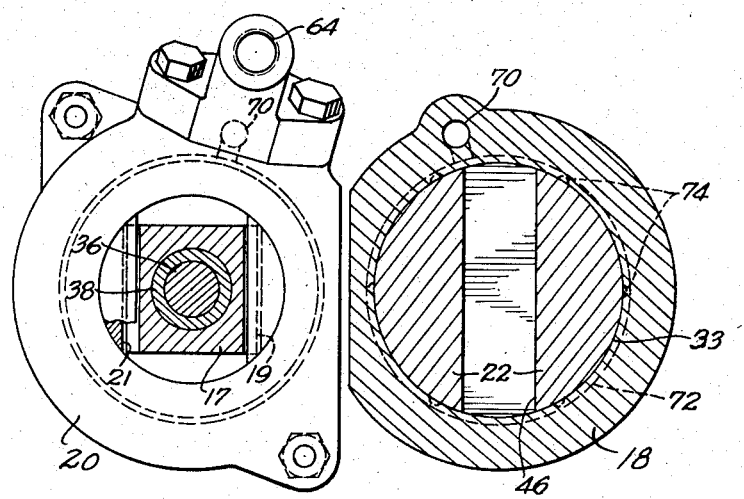
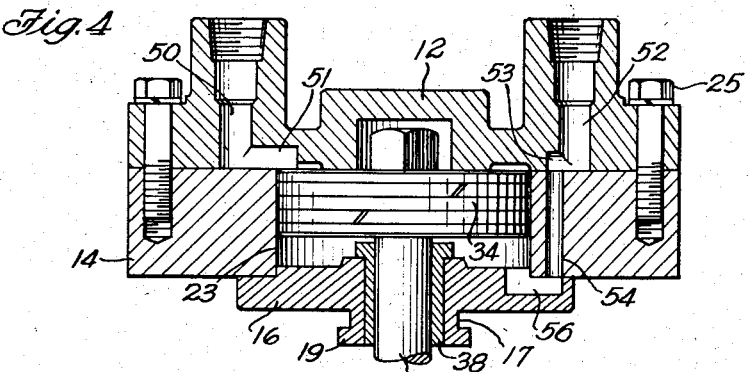
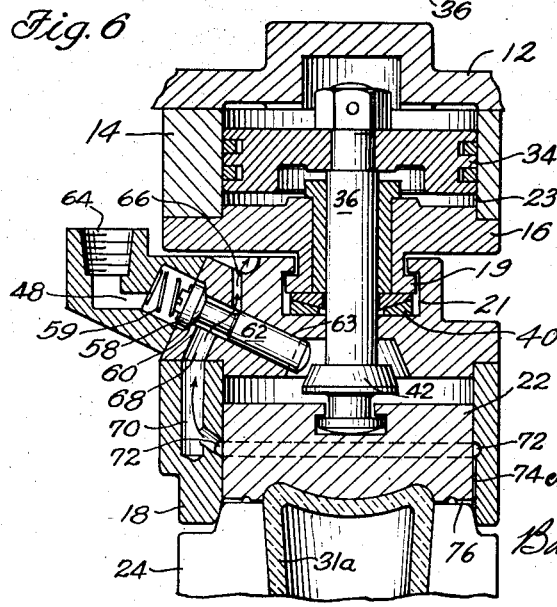
INVENTOR.
Joseph R. Hamilton
BY
Bair, Freeman & Molinare
Attys.

2,877,604
BAFFLE PLATE AND SETTLE-BLOW MECHANISM

Joseph R. Hamilton, Anderson, Ind.

Application September 4, 1956, Serial No. 607,882

6 Claims. (Cl. 49—18)

This invention relates to a combination baffle plate and settle-blow mechanism adaptable for glassware forming machines.

One object of the invention is to provide a combination baffle plate and settle-blow mechanism so designed as to minimize the number of operations during the charging of a parison mold and during the complete forming of a parison therein.

Another object is to provide a mechanism of the character described which involves only seven steps in the forming of a parison as follows:

(1) Engage funnel to parison mold
(2) Charge parison mold with gob of glass
(3) Remove funnel from parison mold
(4) Engage baffle mechanism to parison mold
(5) Settle-blow through baffle mechanism
(6) Counter-blow against baffle mechanism
(7) Remove baffle mechanism from parison mold Still another object is to provide baffle plate actuating mechanism for spacing a baffle plate from a parison mold as a baffle guide ring is engaged with the mold, and at the same time introduce settle-blow air under pressure that may readily flow under the baffle plate and into the mold cavity on top of the charge of glass, thus insuring proper formation of the finish on the parison around the finish pin.

A further object is to provide means to engage and seat the baffle on the mold and simultaneously shut off the flow of settle-blow air preparatory to the mold receiving counter-blow air after the plunger is withdrawn from the finish of the ware, means being provided for venting air from above the parison past the baffle plate and through the baffle plate guide ring to atmosphere as the parison expands within the mold cavity as a result of introduction of counter-blow air thereinto.

Still a further object is to provide means for then disengaging the baffle plate guide ring and the baffle plate from the mold, thus completing the parison forming operation and preparing the baffle plate and settle-blow mechanism for coaction with another parison mold brought into position beneath the baffle plate mechanism for the forming of the next parison therein.

With these and other objects in view, my invention consists in the construction, arrangement and combination of the various parts of my baffle plate and settle-blow mechanism, whereby the objects above contemplated are attained, as hereinafter more fully set forth, pointed out in my claims and illustrated in detail on the accompanying drawings, wherein:

Fig. 2 is a plan view of a combination baffle plate and settle-blow mechanism comprising my present invention;

Figure 6A:
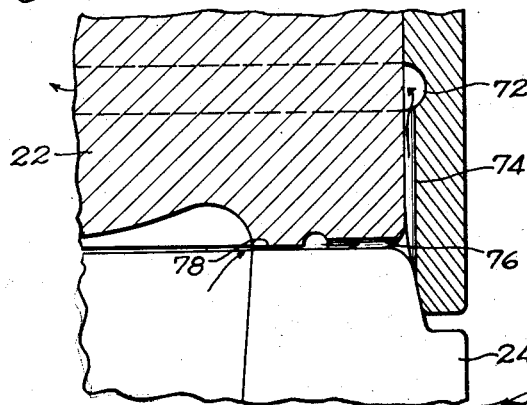

Fig. 3 is a vertical sectional view thereof showing adjacent portions of the parison molds as taken on the line 3—3 of Fig. 2 with a valve mechanism at the left side of the figure being taken on the line 3a and 3a of Fig. 2;

Fig. 4 is a vertical sectional view on the line 4—4 of Fig. 2;

Fig. 5 is a horizontal sectional view on the line 5—5 of Fig. 3;

Fig. 6 is a sectional view similar to a portion of Fig. 3 showing the parts in a different position during the cycle of operations; and Fig. 6A is an enlargement of a portion of Fig. 6 to show details of clearance spaces.

On the accompanying drawings I have used the reference numeral 10 to indicate a supporting arm for my combination baffle plate and settle-blow mechanism. A supporting bracket 12 is adjustably clamped by a clamp 13 and clamp bolts 15 as shown in Fig. 2 to the supporting arm 10 so that it may be adjusted in elevation to fit parison molds of different heights.

A baffle plate cylinder block 14 is provided and secured to the under surface of the bracket 12 by cylinder block bolts 25. The block is provided with a cylinder bore 23 (two bores being provided because the disclosure is of a double gob type of mechanism). Each of the cylinder bores is closed by a baffle plate cylinder cap 16 which has a depending neck 17 of rectangular cross-section as shown in Fig. 5 and a rectangular head 19 for supporting a baffle plate guide ring head 20 as shown in Fig. 3. A baffle plate guide ring 18 is supported in depending position from the baffle plate guide ring head 20 and a baffle plate 22 is vertically reciprocable in the bore 33 of the ring 18. The head 19 of the neck 17 is received in an undercut slot 21 of the baffle plate guide ring head 20 for supporting the latter from the cap 16 and thence by the cylinder block 14 and the supporting bracket 12.

A parison mold of split construction is shown at 24 and is adapted for coaction with the guide ring 18 and the baffle plate 22 as will hereinafter appear. Each half of the parison mold is supported by a parison mold holder 26.

Returning to Fig. 1, a finish pin 27 and a split finish ring 29 with which the parison mold 24 is shown coacting for the glass charging part of the cycle of operations in forming a parison are illustrated. This figure shows the parison mold holder 26 supported by parison mold holder arms 28, and a funnel 30 is engaged with the parison mold through which the gob of glass 31 is introduced into the mold. A funnel supporting arm is shown at 32.

In Fig. 3 a baffle plate piston 34 is shown from which extends a baffle plate piston rod 36. This rod is slidable through a bushing 38 carried by the baffle plate cylinder cap 16 and extends through rocker washers 40 which permit proper seating of the guide ring 18 and the baffle plate 22 on the mold 24.

At 42 I illustrate a cam in the form of a truncated cone on the rod 36 and the lower end of the rod terminates in a head 44. The head 44 is received in an undercut slot 46 of the baffle plate 22 for suspending the baffle plate from the rod 36 and as shown in Fig. 5 the slot 46 extends diametrically across the baffle plate 22.

In Fig. 4 an air connection 50 is shown for an air line from the pneumatic timer of the glassware forming machine for engaging the baffle plate 22 with the parison mold 24 and closing a settle-blow valve when air is supplied to 50 as will hereinafter appear. Also, an air connection 52 is shown for an air line from the timer to lift the baffle plate and open the settle-blow valve. The air connection 52 communicates by means of passages 54 and 56 with the bottom of the baffle plate piston 34 while the air connection 50 communicates through passageway 51 with the top thereof. The passageways 51 and 53 are of dual construction as shown in Fig. 2 for supplying air simultaneously to both cylinder bores 23.

A settle-blow air valve 58 is shown in Fig. 3 in the open position. Its seated position is against a settle-blow air valve seat 60 as shown in Fig. 6 and the valve 58 has a stem 62 slidable in a bore 63 of the head 20 and the stem 62 normally covers a vent 66 to atmosphere. An air connection 64 is illustrated from which a passageway 48 extends to the valve seat 60. From the outlet side of the valve seat 60 passageways 68 and 70 extend to an annular passageway 72 in the guide ring 18 which ring is provided with six vent grooves 74. These communicate with four vent grooves 76 in the bottom surface of the baffle plate 22 which in turn communicate with a clearance space 78 provided to vent the mold cavity as will hereinafter appear.

*Practical operation*

Figure 1:
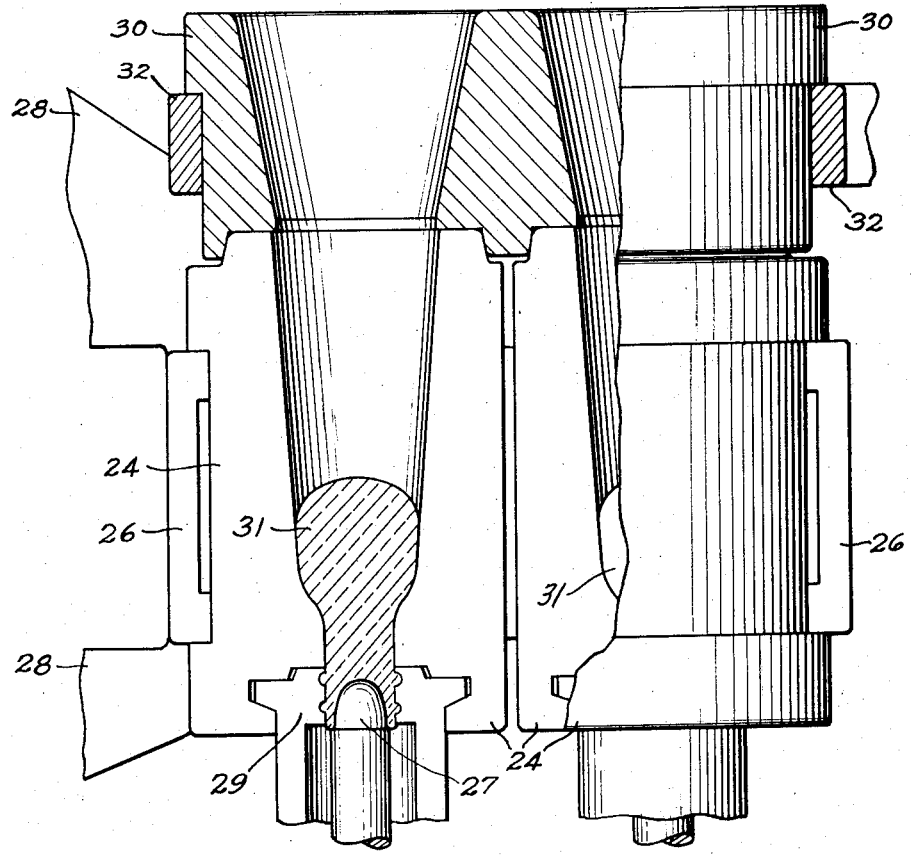
Fig. 1 is a vertical sectional view through a parison mold with finish ring, finish pin and funnel engaged therewith, a gob of glass having just been deposited therein during a cycle of parison forming operations, a double gob type of parison mold being illustrated.

There are seven steps during a cycle of operations of my combination baffle plate and settle-blow mechanism as follows:

(1) Engage funnel
(2) Charge mold
(3) Remove funnel
(4) Engage baffle mechanism
(5) Settle-blow
(6) Counter-blow
(7) Remove baffle mechanism Steps 1 and 2 are illustrated in Fig. 1. The funnel 30 has been engaged (step 1) with the parison molds 24 for directing the gobs of glass into the parison molds 24 and the gobs of glass have been introduced (step 2). Step 3 is removal of the funnel 30 and since this is obvious, it has not been separately illustrated. Engagement and removal may be accomplished by suitable pneumatically or hydraulically operated mechanism.

Steps 4 and 5 are illustrated in Fig. 3. Step 4 is accomplished by suitable motion of the supporting arm 10 by first swinging it into position over the parison molds and then moving it downwardly until the baffle plate guide rings 18 are engaged as illustrated. At this time the machine timer is introducing air through the air connections 52 for holding the two pistons 34 in their raised position and the baffle plates 22 spaced from the upper ends of the parison molds. The cams 42 are in their raised positions also for opening the settle-blow air valves 58. Accordingly, air constantly supplied to the air connections 64, passes through the passageways 48 past the valve seats 60 and through the passageways 68 and 70 and the annular passageways 72 to the vent grooves 74 as indicated by the arrows for settling the gobs 31 down against the finish pins 27 and properly into the finish rings 29 for compacting the gobs of glass 31 against the surfaces thereof and thereby forming perfect finishes (step 5).

Step 6 is illustrated in Fig. 6, air having been cut off to the connection 52 and air introduced into the connection 50 for moving the baffle plate 22 downwardly from the position of Fig. 3 to the position of Fig. 6 which seats the baffle plate on the parison mold so that the parison can be counter-blown against the baffle plate by the introduction of counter-blow air into the space left by the finish pin 27 after it is removed in the usual manner. The counter-blow air blows the parison to shape as illustrated at 31a and air above the parison is vented through the clearance space 78 which is on the order of .003" to minimize the flash on the parison, the vent grooves 76 and 74 and the passageways 72, 70 and 68, escaping through the vent 66 to atmosphere which is uncovered by the stem 62 as the settle-blow air valve is seated by its spring 59 as shown in Fig. 6.

After the counter-blowing of the parison, the only step remaining is number 7—the removal of the baffle plate mechanism. The mechanism is then ready to be engaged with the next parison mold coming into position to receive a charge of glass.

From the foregoing specification it will be obvious that I have provided a relatively simple combination baffle plate and settle-blow mechanism accomplishing the objects set forth and simplifying the parison forming operation to seven steps whereas prior methods involve additional steps which I have eliminated with my design of mechanism.

Some changes may be made in the construction and arrangement of the parts of my combined baffle plate and settle-blow mechanism without departing from the real spirit and purpose of my invention. It is, therefore, my intention to cover by my claims any modified forms of structure or use of mechanical equivalents which may reasonably be included within their scope.

I claim as my invention:

1. In a combination baffle plate and settle-blow mechanism, a support, a cylinder carried thereby, a piston in said cylinder, a piston rod connected with said piston and projecting from said cylinder, a baffle plate guide ring supported by said cylinder and engageable with a parison mold, a baffle plate movable in said guide ring and connected with said piston rod, means for moving said piston in one direction for spacing said baffle plate from the parison mold while said guide ring is engaged therewith and for moving said piston in the opposite direction for seating said baffle plate on the parison mold while said guide ring is engaged therewith, a cam on said piston rod, a normally closed settle-blow air valve adapted to be opened by said cam when said baffle plate is spaced from the parison mold, a passageway connection from the outlet of said settle-blow air valve to the under surface of said baffle plate for freely admitting settle-blow air to the mold cavity, and a vent opened by said settle-blow air valve when closed for venting the mold cavity when said baffle plate is engaged with the parison mold and the parison is being counter-blown, a small clearance space being provided between said parison mold and said baffle plate to permit the venting operation.

2. In a combination baffle plate and settle-blow mechanism, a support, a cylinder carried thereby, a piston in said cylinder, a piston rod connected with said piston and projecting from said cylinder, a baffle plate guide ring supported by said cylinder and engageable with a parison mold, a baffle plate movable in said guide ring and connected with said piston rod, means for moving said piston in one direction for spacing said baffle plate from the parison mold while said guide ring is engaged therewith and for moving said piston in the opposite direction for engaging said baffle plate with the parison mold while said guide ring is engaged therewith, a normally closed settle-blow air valve in said guide ring, means for opening said valve when said baffle plate is spaced from the parison mold, a passageway connection from the outlet of said valve to the under surface of said baffle plate for freely admitting settle-blow air to the mold cavity, a vent, said settle-blow air valve being constructed and arranged to open said vent for venting the mold cavity when said baffle plate is engaged with the parison mold and the parison is being counter-blown.

3. In a baffle plate and settle-blow mechanism of the character disclosed, a support, a baffle plate guide ring supported thereby and engageable with a parison mold, a baffle plate movable in said guide ring, means for moving said baffle plate relative to said guide ring for spacing it from the parison mold while said guide ring is engaged therewith and for moving said baffle plate relative to said guide ring for seating it on the parison mold while said guide ring is engaged therewith, a normally closed combined settle-blow air and vent valve, means for opening the settle-blow air portion of said valve when said baffle plate is spaced from the parison mold, a passageway connection from the outlet of said settle-blow air portion to the under surface of said baffle plate for admitting settle-blow air to the mold cavity, and a vent opened to the under surface of said baffle plate by the vent portion of said valve when the settle-blow air portion thereof is in its closed position for venting the mold cavity when said baffle plate is engaged with the parison mold during a counter-blow operation.

4. A combination settle-blow and baffle plate mechanism comprising a support, a baffle plate guide ring supported thereby and engageable with a parison mold, a baffle plate movable in said guide ring, means carried by said support for moving said baffle plate in one direction for spacing said baffle plate from the parison mold while said guide ring is engaged therewith, means for moving said baffle plate in the opposite direction for engaging said baffle plate with the parison mold while said guide ring is engaged therewith, a two-position, three-way settle-blow air and vent valve, means for moving said valve to one of its positions when said baffle plate is spaced from the parison mold, a passageway connection from said valve to the under surface of said baffle plate for freely admitting settle-blow air to the mold cavity when the valve is in said one position, and means for venting air from said passageway connection by movement of said valve to its other position when the baffle plate engages with the parison mold and the parison is being counter-blown.

5. In a settle-blow and baffle plate mechanism, a support, a baffle plate guide ring supported thereby and engageable with a parison mold, a baffle plate movable in said guide ring, means carried by said support for moving said baffle plate in one direction for spacing said baffle plate from the parison mold while said guide ring is engaged therewith and for moving said baffle plate in the opposite direction for engaging said baffle plate with the parison mold while said guide ring is engaged therewith, a two-position valve carried by said guide ring for admitting settle-blow air to the mold cavity and closing its communication with atmosphere when said baffle plate is spaced from the parison mold and said valve is in one of its positions, said valve in the other of its positions venting the space within the mold cavity to atmosphere and cutting off the supply of settle-blow air when the baffle plate is seated on the parison mold and the parison is being counter-blown.

6. In a combination baffle plate and settle-blow mechanism, a support, a baffle plate guide ring supported thereby and engageable with a parison mold, a baffle plate movable in said guide ring, means for moving said baffle plate in one direction relative to said support for spacing it from the parison mold while said guide ring is engaged therewith and for moving said baffle plate in the opposite direction relative to said support for seating it on the parison mold while said guide ring is in engagement therewith, a cam on said means for moving said baffle plate, a normally closed settle-blow air valve adapted to be opened by said cam when said baffle plate is spaced from the parison mold, a passageway connection from the outlet of said settle-blow air valve to the under surface of said baffle plate for freely admitting settle-blow air to the mold cavity, a vent opened by said settle-blow air valve when closed for venting the mold cavity when said baffle plate is engaged with the parison mold and the parison is being counterblown, and a small clearance space between said parison mold and said baffle plate to permit the venting operation.

References Cited in the file of this patent
UNITED STATES PATENTS

| | | |
|---|---|---|
| 1,590,423 | Cramer | June 29, 1926 |
| 1,759,210 | Soubier | May 20, 1930 |
| 2,235,103 | Garwood | Mar. 18, 1941 |